United States Patent [19]
Hutson

[11] 3,847,551

[45] Nov. 12, 1974

[54] STANDARDIZING OF ALCOHOL-CONTENT MEASURING APPARATUS

[75] Inventor: Donald Hutson, Richmond, Calif.

[73] Assignee: Cal Detect Inc., Richmond, Calif.

[22] Filed: May 18, 1972

[21] Appl. No.: 254,401

[52] U.S. Cl.................. 23/232 R, 73/1 R, 222/394
[51] Int. Cl. ............................................ G01n 33/16
[58] Field of Search...... 23/232 R, 254 R; 73/421.5, 73/1 R; 222/402.1, 394, 395, 402.11

[56] References Cited
UNITED STATES PATENTS

| | | | |
|---|---|---|---|
| 2,953,284 | 9/1960 | Prussin et al. | 222/402.13 |
| 3,476,516 | 11/1969 | Curry | 23/254 R |
| 3,480,185 | 11/1969 | Steinberg et al. | 424/45 X |
| 2,704,621 | 3/1955 | Soffer | 222/402.11 X |

OTHER PUBLICATIONS

Harger et al., J. Am. Med. Assn. 110, 779–785, (1938).

Herzka et al., Pressurized Packaging (Aerosols), Butterworths, London, 1958, pages 19,64,74,75,166,177,206.

*Primary Examiner*—Robert M. Reese
*Attorney, Agent, or Firm*—Polster and Polster

[57] ABSTRACT

A composition for use in standardizing, calibrating or testing apparatus for determining quantitatively the alcohol content of gases consists essentially of dry argon and ethyl alcohol. A measured amount of the composition is introduced to the apparatus to be tested, calibrated or standardized.

5 Claims, No Drawings

3,847,551

STANDARDIZING OF ALCOHOL-CONTENT MEASURING APPARATUS

BACKGROUND OF THE INVENTION

This invention relates to the standardizing of machines for determining quantitatively the alcohol content of gases, such, for example, as breath analyzers used in connection with determining breath alcohol content. Such machines are sold commercially under various trademarks including INTOXIMETER, DRUNKOMETER and BREATHALYZER, among others.

In order to calibrate, standardize, and test such machines, it has been the practice heretofore to pass air through or over a mixture of ethyl alcohol and water. At one time, no constant temperature control was provided and the amount of alcohol delivered to the machine varied with changes in the ambient temperature affecting the alcohol-water solution temperature. A correction was made, using charts, to account for variations in the solution temperature. This was one of the system's basic disadvantages. It also had one advantage in that, if the water-alcohol mixture and the apparatus being tested were both at ambient temperature, the measurement of the ambient temperature provided a reasonably accurate measure of the alcohol content of the sample.

In a next step, in a system which is now standard, the water-alcohol mixture is maintained at a single, accurately predetermined level, which is supposed to produce a single standard result in a properly calibrated and properly operating analyzer. However, there is a difficulty with this present system. Since the ambient temperature often varies from the temperature of the sample container source, there is likely to be a change in the temperature of the gas sample between the source and the machine. If there is any water present in the conduit between the source and the analyzer, there is an interchange between the gas and the water which, again depending upon temperature, may cause substantial deviation from a true standard.

It has been suggested heretofore that alcohol be mixed with a dry gas carrier instead of water. Carbon dioxide has been suggested and tried. However, in order to obtain a useful flow of gas from a container of alcohol and carbon dioxide, the mixture has been compressed to the place at which the carbon dioxide liquifies, producing a two-phase system. This has proved unsatisfactory.

Nitrogen has also been tried. However, it has been found that the disparity in molecular activity between the ethyl alcohol molecules and the nitrogen molecules is such as to produce through the delivery orifice of the source-container a kind of classification of the two, with an initial increase in the proportion of nitrogen, so that the exact composition is not accurately predetermined at every stage in the discharge of the mixture over a series of tests.

One of the objects of this invention is to provide a composition of gases for use in standardizing, calibrating, and testing apparatus for determining alcohol content of gases.

Other objects will become apparent to those skilled in the art in the light of the following description.

BRIEF SUMMARY OF THE INVENTION

In accordance with this invention, generally stated, a composition of gases for use in standardizing apparatus used for measuring the content of alcohol in gas is provided which consists essentially of dry argon and ethyl alcohol. A measured amount of the composition is introduced to apparatus to be tested, standardized or calibrated.

DESCRIPTION OF THE PREFERRED EMBODIMENT

In particular, the composition of this invention is essentially a mixture of dry argon and 50 to 5,000 parts per million of absolute ethyl alcohol. It is preferably packaged in containers either at 1,200 to 2,000 pounds per square inch gauge, the total amount being sufficient for several hundred to a few thousand calibrations, or in small throw away containers, at 50 to 200 PSI which provides an amount sufficient to accomplish several calibrations.

In use, a measured amount of the gaseous composition of the invention is released, through a suitable reducing valve-pressure regulator, through a dry conduit, to the apparatus to be calibrated, or standardized, or tested. Since the gas and apparatus to be tested can be at the same, ambient, temperature, and since there is no water in the system, there is no problem of scavenging. Because the system involves only gas, and because the molecular activity, chiefly a function of the molecular weights in this application, of the ethyl alcohol and argon are sufficiently similar, the composition of the gas system is independent of the temperature, the gas in the tank and the gas reaching the apparatus being homogeneous dispersions with the same composition.

Numerous variations in the composition of this invention and the method of its use, within the scope of the appended claims will occur to those skilled in the art in the light of the foregoing disclosure. For example, small amounts of other gases may be present provided they do not interfere with the homogeneous distribution of the alcohol and argon.

Denatured ethyl alcohol with other components present may be used rather than absolute ethyl alcohol, so long as it is reasonably free of any water which would give a classifying or partioning effect. These variations are merely illustrative.

Having thus described the invention, what is claimed and desired to be secured by Letters Patent is:

1. A composition for use in standardizing, calibrating, and testing apparatus for determining quantitatively the content of alcohol in gas samples consisting essentially of anhydrous argon and 50 to 5,000 parts per million ethyl alcohol.

2. The composition of claim 1 at a pressure of between about 1,000 and 2,000 p.s.i.g.

3. The composition of claim 1 at a pressure of between about 50 and 200 p.s.i.g.

4. The method of standardizing apparatus for determining quantitatively the amount of ethyl alcohol in a gas, comprising introducing to said apparatus a known quantity of a gaseous composition consisting essentially of dry argon and an exactly known amount of ethyl alcohol.

5. The method of claim 4 wherein the gaseous ethyl alcohol constitutes 50 to 5,000 parts per million of the composition.

* * * * *